Sept. 15, 1959  P. WOLF ET AL  2,904,081
OIL STORAGE TANK VENT SPILL-PREVENTING DEVICE
Filed April 14, 1958

INVENTORS
Perry Wolf
Maurice Wolf
Sidney Wolf &
Emanuel Wolf
BY
L. S. Saulsbury
ATTORNEY United States Patent Office 2,904,081
Patented Sept. 15, 1959

2,904,081

OIL STORAGE TANK VENT SPILL-PREVENTING DEVICE

Perry Wolf, Old Bethpage, Maurice Wolf and Sidney Wolf, Roslyn, and Emanuel Wolf, Jamaica, N.Y.

Application April 14, 1958, Serial No. 728,392

4 Claims. (Cl. 141—290)

This invention relates to an oil storage tank vent spill-preventing device.

It is the principal object of the invention to provide a spill-preventing device by which overflow oil through the vent pipe at the time the fuel oil storage tank is being filled by a supply tank or truck, is returned from the vent pipe to the supply tank or truck whereby to eliminate hazards resulting from the oil being spilled upon the floor or about a building structure.

It is another object of the invention to provide a vent spill-preventing device for oil storage tanks to which as a return hose for overflow oil is connected, a valve therein will be automatically closed that will prevent the oil from leaving the vent pipe through the cap vent thereof as the storage tank is being filled.

It is still another object of the invention to provide an air vent spill-preventing device for oil storage tanks having a one-way flap valve insert that can be threaded into a standard T-fitting which when taken with other standard parts will make up the device whereby to provide for a fabricated and inexpensive device.

Other objects of the invention are to provide a vent spill-preventing device for use with oil storage tanks having the above objects in mind, which is of simple construction, has a minimum number of parts, inexpensive to manufacture, durable, easy to adjust, compact, efficient and effective in use.

Figure 1:
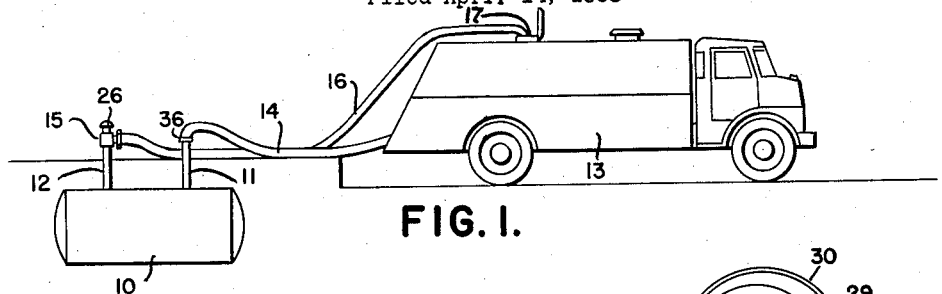
Figure 4:
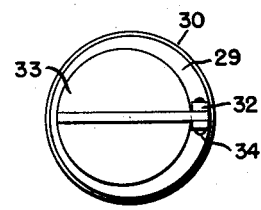
Figures 2, 6:
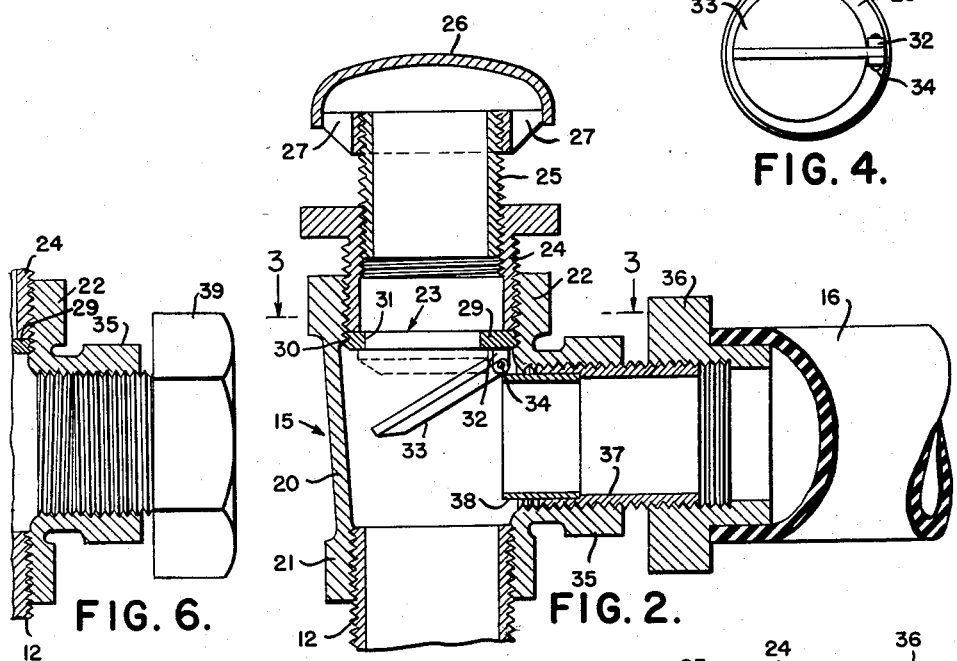
Figure 3:
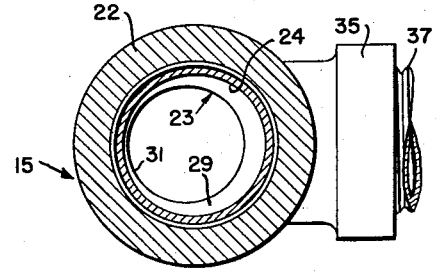
Figure 5:
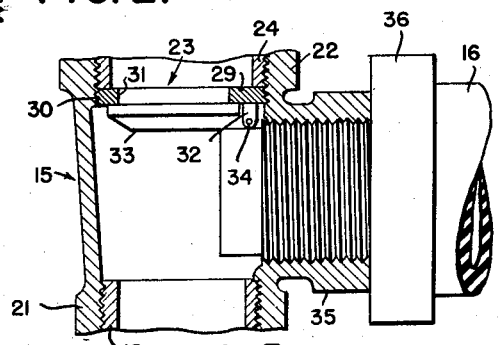

For a better understanding of the invention, reference may be had to the following detailed description taken in connection with the accompanying drawing, in which Figure 1 is a diagrammatic view of an oil storage tank and oil supply truck connected to the storage tank with hose connection for filling the storage tank and for the return of overflow oil from the vent pipe, Fig. 2 is an enlarged vertical sectional view of the vent spill-preventing device by which the return hose is partly connected to the vent pipe, Fig. 3 is a tranverse sectional view taken on line 3—3 of Fig. 2, Fig. 4 is a bottom plan view of the flap valve insert, Fig. 5 is a fragmentary sectional view similar to Fig. 2 except that the return hose has been fully extended into the fitting and the flap valve elevated thereby to its closed position, and Fig. 6 is a fragmentary sectional view showing the return hose fitting replaced by a plug.

Referring now to the figures, 10 represents an oil storage tank usually disposed underground which has a fill pipe 11 and a vent pipe 12 extending upwardly therefrom. This vent pipe 12 is often hidden from view of the truck driver and can overflow without his notice. When the oil storage tank 10 is being filled from an oil supply truck 13 the hose 14 is connected to the fill pipe 11. Oftentimes, the oil from the storage tank 10 being filled to near the top will spill from the vent pipe 12. The pump on the supply truck 13 needs to be stopped at the time but many times much oil has been lost before the operator notices the overflow oil.

According to the present invention a special vent fitting or spill-preventing device 15 is employed to which a return hose 16 is connected for returning the overflow oil through an opening 17 in the top of the oil supply truck 13. This vent spill-preventing device 15 has a T-fitting 20 having an internally-threaded portion 21 by which the device is secured to the vent pipe 12, Fig. 2. Above the internally threaded portion 21 is an internally threaded portion 22 into which is threaded a one-way flap valve insert 23. This flap valve insert 23 is seated along the threads of the portion 21 and is locked in place thereon by means of a lock sleeve nut 24. The lock sleeve nut 24 is internally threaded and has threaded thereto a cap sleeve 25 to which a vent cap 26 is threadedly connected. Normally, as the tank 10 is filled, air will leave the tank through side passages 27 of the vent cap 26.

The one-way flap valve insert 23 comprises a vent plate 29 that is threaded about its periphery as indicated at 30. This plate 29 has a vent opening 31 of circular shape that is offset from one side of the plate 29. Depending from the underface of the plate 29 and from the bottom side thereof is a depending hinge projection 32 to which a flap valve element 33 is hingedly connected by means of a pivot pin 34. This flap valve element is normally dropped by gravity to its open position and when closed assumes the dotted line position shown in Fig. 2 by the sleeve 38 as the return hose 16 is connected to the device.

Extending ninety degrees from the portions 21 and 22 of the T-fitting 20 is an internally threaded portion 35 to which the return hose 16 is coupled. The hose 16 has a coupling body 36 with threaded sleeve 37 connected thereto for the connection of the same to the threaded portion 35 of the T-fitting 20. On the inner end of the sleeve 37 is an extension sleeve 38 adapted to engage the underside of the valve element 33 to lift valve element to its closed position as shown in Fig. 5 as the return hose coupling 36 is screwed home in the T-fitting 20. Through the sleeves 38 and 37 overflow oil will pass and be returned through the hose 16 to the top of the supply truck 13.

It should now be apparent that with a simple fabricated T-fitting arrangement that a flap closure valve assembly 23 can be seated in one portion 22 of the T-fitting 20 and locked in place by the threaded sleeve nut 24. Similarly, through another portion 35 of the valve, element 33 is automatically closed by the sleeves 38 and 37 as the coupling 36 of the return hose 16 is connected to the portion 35 of the fitting 20. The valve element 33 should be well hung to prevent the same from being closed by the air being vented from the tank 10 under normal conditions of the oil being taken from the tank 10 and after the hose 16 has been disconnected.

Upon detaching the hose coupling 36 and its sleeve 37 from the portion 35 of the fitting 20 a closure plug is threaded thereunto so that all of the venting will be taken through the vent cap 26. It should be apparent that there has been provided now a simple vent spill-preventing device that can be placed upon any oil storage tank vent pipe and to which a return hose can be connected for returning overflow oil to the tank car or truck.

While various changes may be made in the detailed construction, it shall be understood that such changes shall be within the spirit and scope of the present invention as defined by the appended claims.

What is claimed is:

1. An oil storage tank vent spill-preventing device comprising a fitting adapted to be attached to the vent pipe of an oil stoareg tank, said fitting having threaded openings lying at an angle to one another, a flap valve unit disposed in one of the threaded openings, means for locking said valve unit within the one opening, said flap valve unit comprising a disc with an opening therethrough adapted to be aligned with the one opening of the fitting, a flap valve element hinged to the underside of said disc and adapted to overlie the valve opening, and a return hose coupling secured to the other opening of the fitting and having an extension engageable with the valve to lift it automatically to its closed position as the coupling is secured to the fitting.

2. An oil storage tank vent spill-preventing device as defined in claim 1, and said flap valve unit disc being threadedly adjustable in the one threaded opening and said locking means comprising a threaded lock sleeve nut threaded in said fitting threaded opening upon said flap valve disc.

3. An oil storage tank vent spill-preventing device as defined in claim 2, and a threaded sleeve threaded into said sleeve nut and a vent cap secured to said threaded sleeve.

4. In combination, an oil storage tank having filling and vent pipes extending therefrom, a supply tank and a filling hose extending between the tank and the filling pipe, a vent spill-preventing device secured to the vent pipe and having vent and hose connecting openings, said device further having a valve within the vent opening adapted to be automatically closed as a hose coupling is connected thereto, and a return hose detachably connected to the spill-preventing device and having means engageable with the valve as the return hose is connected thereto to hold the valve closed and running to the top of the supply tank.

References Cited in the file of this patent

UNITED STATES PATENTS

| | | |
|---|---|---|
| 1,968,141 | Green | July 31, 1934 |
| 2,056,828 | Clawson | Oct. 6, 1936 |
| 2,723,070 | Merriam | Nov. 8, 1955 |